Jan. 12, 1960 R. WIKEN 2,920,497
DIVIDED POWER TRANSMISSION
Filed April 24, 1958 3 Sheets-Sheet 1

INVENTOR.
Ralph WIKEN
BY
Quarles & French
Attorneys

Jan. 12, 1960  R. WIKEN  2,920,497
DIVIDED POWER TRANSMISSION
Filed April 24, 1958  3 Sheets-Sheet 3
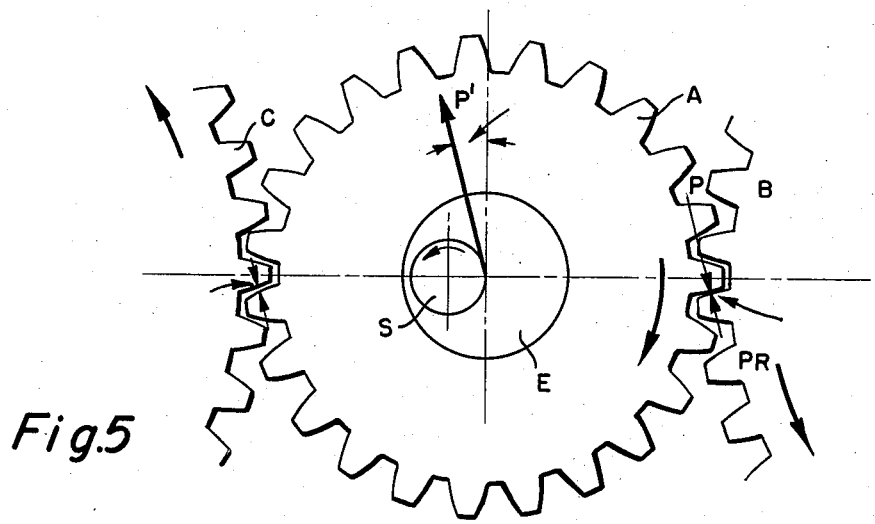
Fig.5
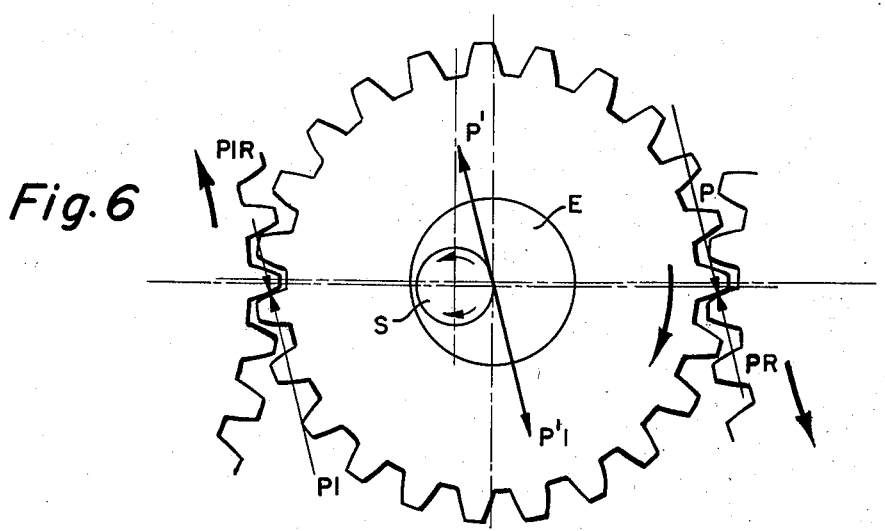
Fig.6
Fig.7
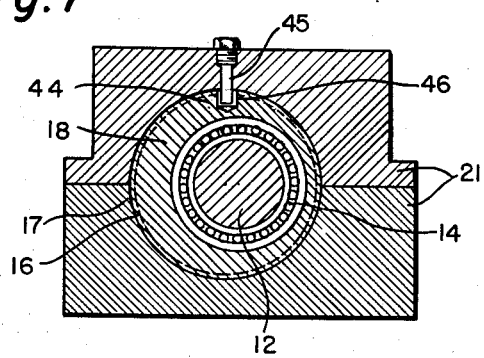
INVENTOR.
Ralph WIKEN
BY
Charles French
Attorneys

United States Patent Office 2,920,497
Patented Jan. 12, 1960

2,920,497
DIVIDED POWER TRANSMISSION

Ralph Wiken, Bayside, Wis., assignor to The Falk Corporation, Milwaukee, Wis., a corporation of Wisconsin Application April 24, 1958, Serial No. 730,643

4 Claims. (Cl. 74—410)

The invention relates to divided power transmissions.

In divided power transmissions a single drive pinion is used to transmit its power to a pair of oppositely disposed gears on separate driven shafts. In order to transmit equal power to each of the separate shafts, the gears on these shafts must be maintained in mesh with the drive pinion, and the object of this invention is to provide a bearing structure for the drive pinion which insures its meshing with both of the driven gears so as to equalize the torque transmitted to each of these gears and by so doing eliminate any clearance at the tooth contact in this type of gearing arrangement.

A further object of the invention is to provide a divided power gearing arrangement in which the drive gear is journalled in bearings mounted in bearings which are eccentrically mounted relative to the axis of the drive gear shaft so that under a toothed reaction between the drive gear and one of the driven gears the eccentric bearings may have the effect of shifting the drive gear shaft bearing so that the drive gear will also mesh with the other gear under the application of the load if for any reason there is an initial clearance between the drive gear and said other gear.

A further object of the invention is to provide in the gearing arrangement above described self-alining journal bearings for the drive pinion shaft in the eccentrics above referred to to permit oscillatory movement of said drive shaft.

The invention further consists in the several features hereinafter set forth and more particularly defined by claims at the conclusion hereof.

In the drawings:

Figs. 5 and 6 are diagrammatic views to aid in explaining the action of certain of the parts;

Fig. 7 is a detailed horizontal sectional view taken on the line 7—7 of Fig. 1.

Figure 1:
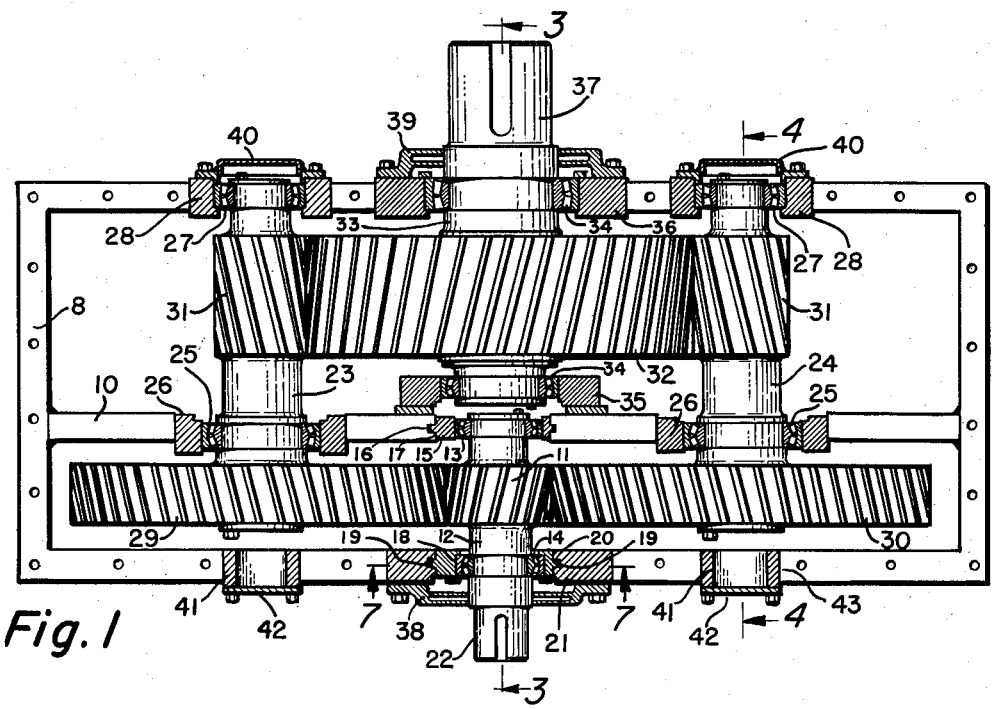
Fig. 1 is a horizontal sectional view taken on the line 1—1 of Fig. 2.
Figure 2:
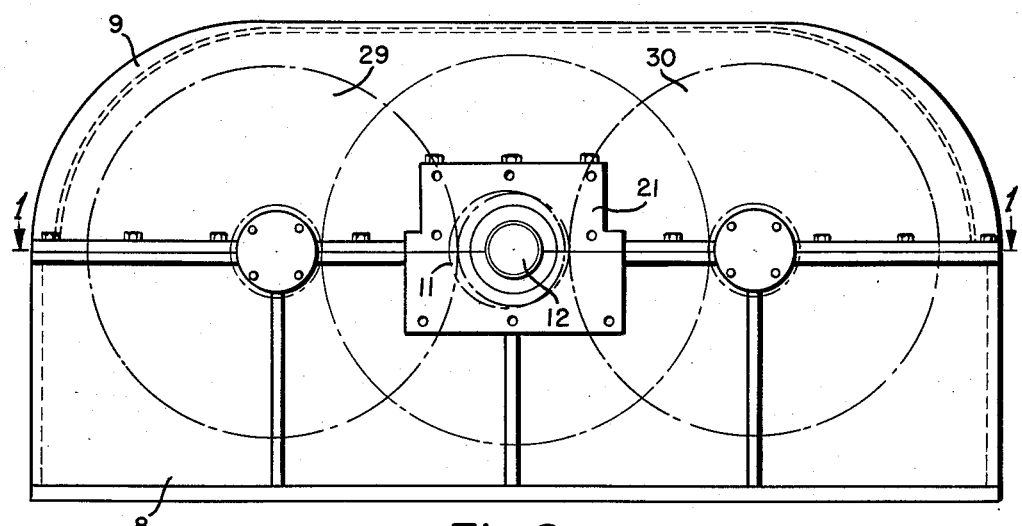
Fig. 2 is a front elevation of a transmission embodying the invention.
Figure 3:
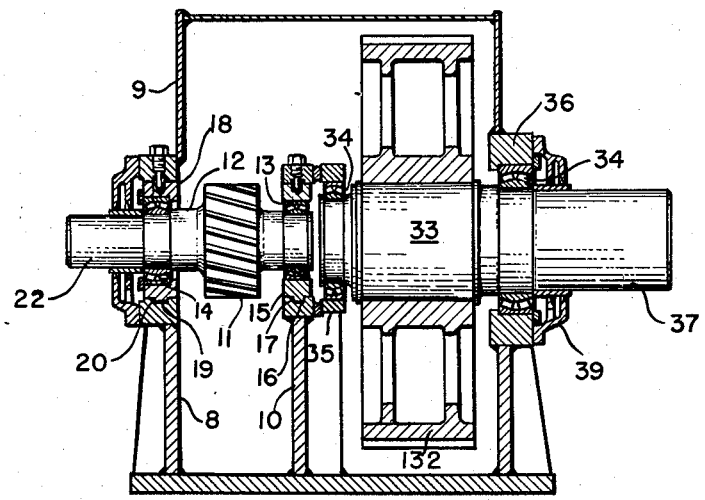
Fig. 3 is a detailed vertical sectional view taken on the line 3—3 of Fig. 1.
Figure 4:
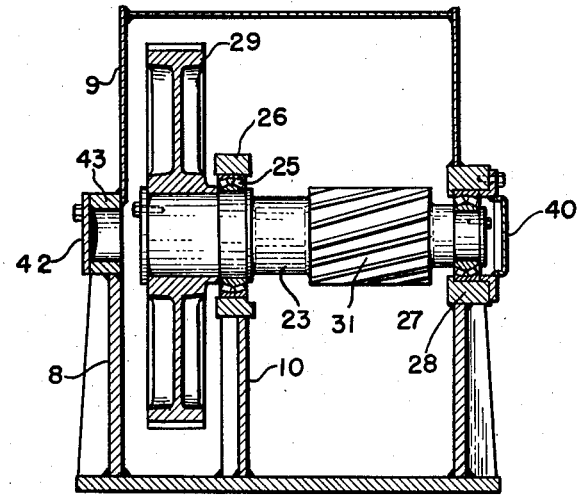
Fig. 4 is a detailed vertical sectional view taken on the line 4—4 of Fig. 1.

Referring to Figs. 1 and 2 of the drawings, the structure includes a sectional housing having a bottom half 8 and a top half 9 and provided with an intermediate panel portion 10 on the bottom half portion 8, the sides and said panel being bored out in the bearing box portions.

A drive pinion 11 has its shaft 12 mounted in self-alining journal bearings 13 and 14 here shown as of the roller bearing type. The bearing 13 has its outer race mounted and secured eccentrically in a cylindrical mounting member 15 which is rotatably movable in a bore provided by the split portions of the panel 10 and is held against lateral movement by having an annular peripheral rib 16 which seats in an annular groove 17 in the panel parts. The bearing 14, identical with the bearing 13, though it may be wider as shown has its outer race mounted and secured eccentrically in a cylindrical mounting member 18, similar to the mounting member 15, and provided with an annular peripheral rib 19 which seats in an annular groove 20 in the split bearing box 21 whose parts are welded to split parts of the front wall of the housing. The front end 22 of the shaft 12 projects outwardly therefrom for connection with a source of driving power.

A pair of parallel spaced shafts 23 and 24 are in each instance journalled in a self-alining roller-type journal 25 in a split bearing box 26 whose parts are welded to split parts of the panel 10 and in a self-alining roller type journal 27 in split bearing box 28 whose parts are welded to split parts of the rear side of the housing. The shaft 23 carries a gear 29 suitably fixed thereto, and the shaft 24 carries a gear 30 suitably fixed thereto and identical with the gear 29. In some instances these shafts may project from the rear of the housing for connection with a driven member, but in the present instance each shaft has a pinion 31 formed integral with or secured thereto adapted to mesh with a gear 32 to provide a reduction in speed to the driven shaft 33 that carries the gear 32. The pinions 31 meshingly engage opposite edges of the gear 32, and the shaft 33 is journalled at opposite sides of the gear 32 in self-alining roller type bearings 34. The front bearing 34 is mounted in a split bearing box 35 whose parts are suitably anchored to a side of the panel portion 10, and the rear bearing 34 is mounted in a split bearing box 36 whose parts are welded parts forming the rear wall of the housing. The end 37 of the shaft 33 projects from the housing for connection with a shaft or other member of the machine or mechanism to be driven.

Oil seal covers 38 and 39 are respectively provided for the shafts 12 and 33 and end covers 40 for the rear ends of the shafts 23 and 24. Bushings 41 and covers 42, therefore, are provided for bore holes 43.

Since the members 15 and 18 form eccentric mountings for the bearings 13 and 14, they may be termed eccentrics. Each of these eccentrics is mounted in its associated fixed housing part for limited rotary movement by providing as shown in Fig. 7 in connection with the front bearing a slot or recess 44 into which a pin 45, anchored in the bearing box or panel portion, projects, leaving a certain predetermined clearance 46 through which the eccentric can turn counterclockwise before being stopped by the pin.

While manufacturers of gear drives strive to produce structures in which the shafts and the gearing associated therewith are accurately alined, it is almost impossible to avoid some backlash in the gearing, and the presence of such backlash could in a case of the gearing above described result in an unequal distribution of the torque applied by the pinion 11 to the gears 29 and 30, but with the present arrangement the eccentrics 15 and 18 provide a floating mounting for the shaft 12 of the pinion 11 which compensates for any initial clearance that might occur between the pinion 11 and one of its companion gears 29 or 30. The compensating action of the eccentrics 15 and 18 will be apparent from the diagrams of Figs. 5 and 6 where E represents one of the eccentrics, S the shaft for the drive pinion or gear A, and B and C the driven gears, the arrows P'1 and P' reaction pressure, the arrows P and PR the pressure loads between the gears A and B, and the arrows P1 and PR1 the pressure loads between the gears A and C.

Assuming that driving power is applied to the shafts to impart clockwise rotation to the gear A and that teeth of the gears A and B are in contact while a tooth of gear C is not directly engaged, as soon as the driving torque puts pressure between the contact points denoted by the arrows P and PR of Fig. 5, a reaction pressure indicated by the arrow P' is set up tending to shift the eccentric E so as to raise the shaft S slightly to the position shown in Fig. 6 to bring the teeth of the gears A and C into contact through the contact points denoted by the arrows R1R and P1 while pressure contact between the gears A and B are still maintained, and because of this contact the reaction pressure indicated as P' is counterbalanced by an equal and opposite reaction pressure indicated as P'1 so that each of the gears B and C receive half of the driving torque from the gear A, this movement of the eccentric E being permitted as shown by Fig. 7.

It is to be noted that the pin 45 is of aid in the initial set up and alinement of the eccentrics and that it does not act as a stop for movement of its associated eccentric as above described in the normal operation of the gearing but may limit the over all travel of the eccentric.

While the gears of the gearing have been shown as single helical toothed gears, spur tooth or tooth forms of gears may be used without departing from the invention.

I desire it to be understood that this invention is not to be limited to any particular form or arrangement of parts except as defined in the appended claims.

What I claim as my invention is:

1. In a divided power transmission, the combination of: a housing; a pair of parallel spaced shafts journaled in said housing; a gear carried by each of said shafts; said gears being substantially identical; a drive shaft lying between said two shafts substantially parallel thereto; a pinion mounted on said drive shaft to rotate therewith, and adapted to drivingly mesh with both of said gears; a pair of axially aligned mounting members journaled on said housing at opposite faces of said pinion for rotation in unison, the axis of said members being substantially parallel to and coplanar with the axes of the two gear shafts, and nearer to one of said shafts than the other; the drive shaft being journaled eccentrically in the mounting members; said members being normally so oriented that the axis of said drive shaft lies substantially midway between the axes of the two gears substantially on the common plane of the axes of the two gears; whereby when the pressure of tooth contact between the pinion and one of the gears becomes greater than the pressure of tooth contact between the pinion and the other gear, this difference in pressure acting against the mounting member automatically shifts the axis of the drive shaft transversely of said plane until the pressure is equalized.

2. The power transmission as defined in claim 1, wherein the shaft of the drive pinion is journalled in self-alining journals in said mounting members.

3. The power transmission as defined in claim 1, wherein means are provided for initially orienting said mounting members relative to the drive shaft to provide similar eccentricities for each of said members.

4. The power transmission as defined in claim 3, wherein the orientation means comprises a similarly located slot in each mounting member, and a pin similarly located in the housing and extending into said slot.

References Cited in the file of this patent

UNITED STATES PATENTS

| | | |
|---|---|---|
| 945,806 | Rhodes | Jan. 11, 1910 |
| 1,293,047 | Davies | Feb. 4, 1919 |
| 1,548,554 | Roder | Aug. 4, 1925 |
| 1,696,740 | Treschow | Dec. 25, 1928 |
| 2,155,766 | Morrison | Apr. 25, 1939 |
| 2,703,497 | Townsend | Mar. 8, 1955 |